United States Patent [19]

Andreas

[11] Patent Number: 4,825,319
[45] Date of Patent: Apr. 25, 1989

[54] CARTRIDGE-SHAPED CLEANING DEVICE
[75] Inventor: Sam Andreas, Astoria, N.Y.
[73] Assignee: Recoton Corporation, Long Island City, N.Y.
[21] Appl. No.: 67,488
[22] Filed: Jun. 26, 1987
[51] Int. Cl.⁴ .............................................. G11B 5/41
[52] U.S. Cl. .................................................... 360/128
[58] Field of Search ....................................... 360/128; 15/DIG. 12-13

[56] References Cited

U.S. PATENT DOCUMENTS

| 3,761,994 | 10/1973 | Becht .................................. | 360/128 |
| 4,225,893 | 9/1980 | Loiselle ............................... | 360/128 |
| 4,272,796 | 6/1981 | Van Kreuningen et al. ....... | 360/128 |
| 4,442,468 | 4/1984 | d'Alayer de Costemore d'Arc ................................. | 360/128 |
| 4,458,281 | 7/1984 | Kara ................................... | 360/128 |
| 4,586,099 | 4/1986 | Suzuki et al. ...................... | 360/128 |
| 4,594,629 | 6/1986 | d'Alayer de Costemore d'Arc ................................. | 360/128 |
| 4,716,485 | 12/1987 | Yeung ................................ | 360/128 |

FOREIGN PATENT DOCUMENTS

| 0123124 | 10/1984 | European Pat. Off. ............ | 360/128 |
| 58-114324 | 7/1983 | Japan ................................. | 360/128 |
| 2072920 | 10/1981 | United Kingdom ............... | 360/128 |

OTHER PUBLICATIONS

RECOTON Cleaning Device with Hub Drive, constructed substantially in conformance with the attached FIGS. 1-4, on sale in the United States for more than one year.

Primary Examiner—A. J. Heinz
Attorney, Agent, or Firm—Curtis, Morris & Safford

[57] ABSTRACT

A cleaning apparatus for cleaning the heads of tape player/recorder units in which, when the cleaning apparatus is operably loaded into the unit, movement of the pinch roller and capstan of the unit turns a cleaning element positioned against the head. Transmission of the rotary movement of the pinch roller and capstan is achieved by a rotatably mounted drive belt connected to a cleaning element, such as a felt pad, so that as the pinch roller and capstan rotate, the belt is driven, thus causing the cleaning element to be rotated against the head about an axis substantially perpendicular to the plane of the face of the head of the unit. A tape drive cleaning assembly is included which cleans the pinch roller and capstan of the unit when the cleaning apparatus is turned upside down.

11 Claims, 2 Drawing Sheets

CARTRIDGE-SHAPED CLEANING DEVICE

BACKGROUND OF THE INVENTION

This invention relates generally to cleaning devices for tape recorder/player units, and, more particularly, to a cartridge-shaped cleaning device inserted into and driven by the tape unit which automatically cleans the head and tape drive mechanism when the unit is activated.

Heretofore, an effective method of removing dirt and other extraneous material from head and drive mechanisms of recorders/players has been to manually clean them with swabs and solvents. This method, however, is time consuming and messy. Also, this technique is quite difficult, if not impossible, to carry out in units, such as in some automotive installations, where the head and tape drive elements are inaccessible unless the unit is disassembled. To overcome these disadvantages, cleaning devices have been devised which utilize a standard cassette housing having an abrasive band in place of the magnetic tape. When such cassette cleaners are inserted into cassette recorders/players, the band is driven across the tape head to remove accumulations. This type of cleaner is unsatisfactory because, over prolonged use, the abrasive material of the band tends to wear the tape head. Also the band cleans only that part of the head which is contacted directly by the abrasives. Because of this, accumulations above and below the edges of the band and those which are forward and behind the point of contact of the band with the head are missed and remain.

Another disadvantage of the abrasive-band cassette-cleaner is that the band is not absorbent and thus cannot retain cleaning solvents which are useful in loosening and removing accumulations.

Other types of cassette-cleaning devices have been proposed in which a cam-driven wiper arm is pivotally mounted in the housing. This wiper arm is driven back and forth across the head by the motion of the cam which, in turn, is driven by the usual supply or take-up reel of the cassette recorder/player. A cleaning pad is fixed to one end of the wiper arm for intermittent contact with the head of the recorder/player. One problem encountered with this design is that the head configurations of various recorders/players differ both in size and location from one another. This can result in uneven cleaning as well as functional areas of the head left totally untouched.

A further problem arises from the fact that if the wiper arm encounters too much resistance in moving across the head of the unit, the wiper arm may bind, thus preventing the cam from rotating and thereby triggering an automatic shut-off mechanism in the recorder/player which stops the unit before cleaning is complete.

Another proposed device for cleaning the head of a tape recorder/player utilizes a series of brushes outwardly mounted along the circumference of a sprocket wheel within a cassette housing. When the recorder/player is activated with this cleaner therein, the brushes sweep across the face of the head to dislodge accumulations. A disadvantage of this design is that the brushes are not absorbent and thus incapable of retaining cleaning solvents. Also, since the effectiveness of this cleaner is dependent upon the stiffness of the brushes, the fact that the brushes are not replaceable renders the unit ineffective when the brushes deteriorate.

OBJECTS OF THE INVENTION

In view of the foregoing, it is an object of the present invention to provide a cartridge-shaped cleaner which avoids the disadvantages of the prior art.

More specifically, it is an object of the present invention to provide a cartridge-shaped cleaner for tape recorders and/or players which reliably clean the head and drive mechanism of those units by rotating a cleaning element about an axis substantially perpendicular to the plane of the face of the head without encountering sufficient resistance to the cleaning motion of the cleaner to activate an automatic stop mechanism.

It is another object of the present invention to provide a cartridge-shaped cleaner capable of utilizing cleaning solvents to enhance the mechanical cleaning of the tape drive mechanisms and heads of the recorders/players with which it is used.

A further object of the present invention is to provide a versatile cartridge-shaped cleaner which is simple, inexpensive, and effective for use with various types of cassette recorders/players.

Various other objects, advantages and features of the present invention will become readily apparent from the ensuing detailed description, and the novel features will be particularly pointed out in the appended claims.

SUMMARY OF THE INVENTION

The present invention comprises a cartridge-shaped cleaner enclosed in a standard cassette-type housing and which is powered by the tape transport mechanism of a conventional cassette-type tape deck to operate its cleaning elements. The cleaner includes a head cleaning assembly which is rotatably fixed within the housing such that when the apparatus is disposed in the tape deck and the tape deck is activated (e.g. in its play or record mode), a cleaning element, such as a replaceable absorbent pad, is operably positioned against the head of the unit and rotates about an axis substantially perpendicular to the plane of the face of the head, thereby effectively and efficiently cleaning the head.

In a preferred embodiment of the invention, the pinch roller and capstan of the tape deck which normally drive the tape of a conventional tape cassette drives an endless drive belt mounted in the cassette housing of the cartridge cleaner. This drive belt is directed by idler wheels to a pulley on a rotatable rod to which the head cleaning element is mounted, whereby the cleaning element rotates about the longitudinal axis of the rod.

Also positioned in the cassette housing is a tape drive cleaning assembly including another cleaning element adapted to contact and wipe the pinch roller and/or capstan of the tape deck as the pinch roller and capstan turn. The cleaning element used to contact and wipe the pinch roller and/or capstan is preferably in the form of a replaceable absorbent cleaning pad held in the cassette housing by a removable holder. To clean the pinch roller and/or capstan, the cartridge cleaner is inserted into the tape deck upside down, and the player/recorder activated.

Cleaning of the head and tape drive element (i.e. the pinch roller and/or capstan) may be enhanced by soaking the cleaning elements in cleaning solvent prior to loading the cassette-cleaner into the tape deck.

BRIEF DESCRIPTION OF THE DRAWINGS

The following detailed description, given by way of example, and not intended to limit the present invention solely to the described embodiment, will best be understood in conjunction with the accompanying drawings in which.

DETAILED DESCRIPTION OF A PREFERRED EMBODIMENT

Figure 1:
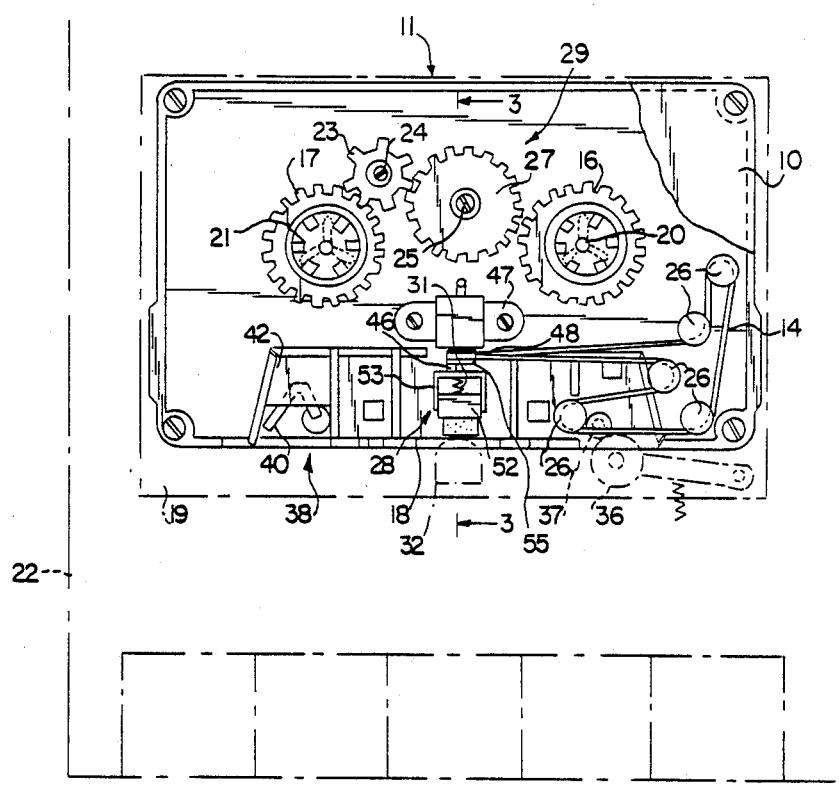
FIG. 1 is a top elevational view of one embodiment of the cartridge-shaped cleaner of the present invention with the top cover of the cleaner cut away for purposes of illustration.

Referring now to the drawings, and in particular to FIG. 1, there is shown a top view of a preferred embodiment of the cartridge-shaped cleaner 11 in accordance with the present invention disposed within a tape receiving area 19 of a tape recorder/player unit 22 (shown in phantom). The recorder/player 22 shown is of standard design having supply and take-up spindles 20, 21, a pinch roller 36 and a capstan 37 (all shown in phantom) located within tape receiving area 19. Also positioned within the tape receiving area 19 is a record/playback head 32 which extends into a cavity 18 of the cartridge-shaped cleaner housing 10 when the recorder/player is activated.

Figure 4:
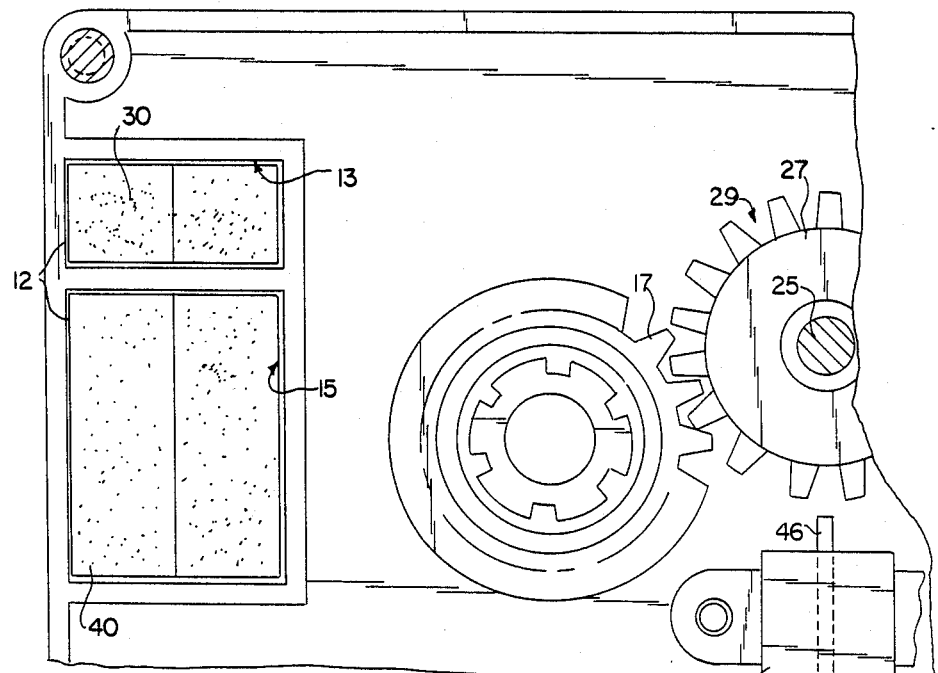
FIG. 4 is an enlarged top elevational view of a portion of another embodiment of the present invention detailing the replaceable pad compartment and a portion of the drive mechanism of the cartridge-shaped cleaner.

A head cleaning assembly 28 is mounted in the interior of cassette housing 10 to extend into cavity 18 and is driven by an endless drive belt 14, which is conveniently a rubber band, that transmits the rotary movement of the capstan 37 and pinch roller 36 the tape drive mechanism of tape recorder/player 22 to a felt pad cleaning element 30 of the cleaning assembly. A series of idler wheels 26 direct the drive belt around a pulley 48 on the head cleaning assembly to transmit rotary motion to the head cleaning assembly about an axis substantially perpendicular to the face of the head 32 of the recorder/player 22 in response to the rotation of drive belt 14. The cartridge-shaped cleaner also has hub gears 16 and 17 which are inter-coupled by transmission assembly 29 so both spindles 20 and 21 rotate when either spindle 20 or 21 is rotated. This interconnection of the spindles 20 and 21 is necessary to prevent automatic shutoff of the tape drive mechanism. In this embodiment a sprocket wheel 27 rotates about a fixed pin 25 and meshes with hub gear 16 and, by way of idler gear 23, with hub gear 17 so as to form a gear train. Smaller diameter idler gear 23, rotatable about a second fixed pin 24, can be placed between the sprocket wheel 27 and hub gears 17 (for example) to smooth out the operation of the gear train. This idler gear may also be omitted, as shown in FIG. 4.

Figure 3:
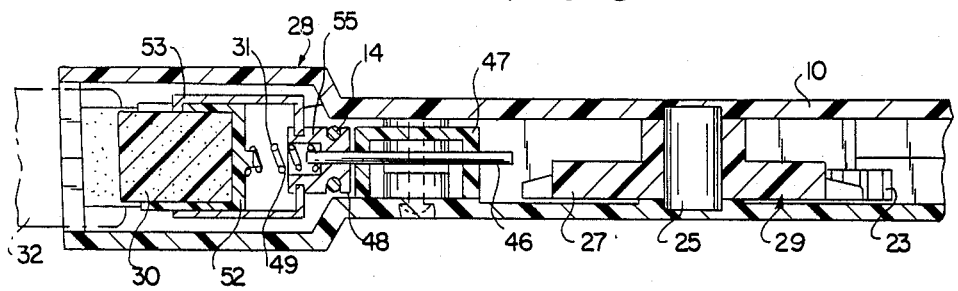
FIG. 3 is a sectional view taken along line 3—3 in FIG. 1.

As best illustrated in FIG. 3, head cleaning assembly 28 comprises a cup 52 held within a U-shaped cup holder 53 and containing a cleaning element 30 therewithin. Preferably, the cleaning element is made of an absorbent material such as felt. Cup 52 is slidably mounted within cup holder 53 at the end of a rotatable rod 46.

The middle of rod 46 has a hub 55 with a pulley 48 affixed thereto, this pulley being driven by belt 14. Rod 46 is rotatably mounted in a bore of a positioning block 47 fixed within the cartridge-shaped cleaner housing 10, whereby the rod 46 turns freely.

A biasing spring 31 is fixed at one end within a hollow 49 in the rod 46 and at its other end to the cup 52 to bias cleaning element 30 firmly against the head 32 of the recorder/player 22. The force extended by spring 31 allows the cleaning element 30 to clean the head of recorder/player 22 without stopping the rotational motion of the head cleaning assembly 28 due to binding of the cleaning element against the head. If this were to occur, the rotatable rod 46 would stop, thus stopping the motion of the sprocket wheel 27 which would stop the motion of the hub gears 16, 17. By stopping the hub gears 16, 17, the drive spindle 20, 21 of the recorder/player 22 would likewise be stopped thus triggering an automatic shut-off device if the recorder/player 22 is so equipped.

Figure 2:
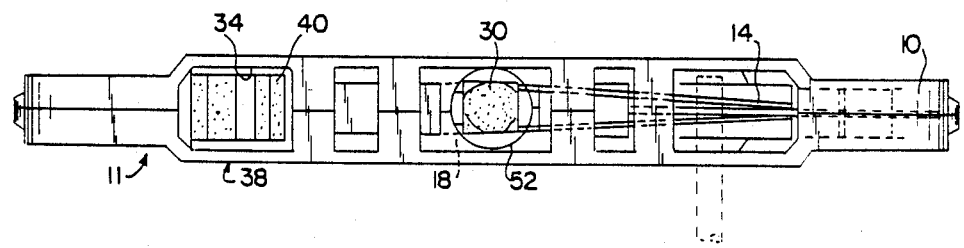
FIG. 2 is a front view of the cartridge-shaped cleaner.

Referring again to FIGS. 1 and 2, in this embodiment, the cartridge-shaped cleaner contains a tape-drive cleaning assembly 38 for cleaning the tape drive components including the pinch roller 36 and capstan 37. Each cleaning assembly utilizes a replaceable cleaning element 40 which can be made of various materials including felt or cotton. Element 40 is held in a recess 34 within the housing 10 by a holder 42.

When the cartridge-shaped cleaner is operably loaded into the recorder/player 22 upside down and the unit is activated, the cleaning element 40 contacts the pinch roller 36 and capstan 37 to clean them as they turn.

In operation, the cartridge-shaped cleaner 11 is placed into the tape receiving area 19 of tape recorder/player 22 such that the head cleaning assembly 28 mounted in the cavity 18 of the housing 10 addresses the tape recorder/player head 32. When recorder/player 22 is activated (i.e. placed in the play or record mode), head 32 and the pinch roller 36 extend into cavity 18 and recess 34, respectively to pinch and drive the drive belt 14. Cup holder 53, cup 52 and cleaning element 30, fixed to one end of rod 46, thus are rotatably driven. Cleaning element 30 is biased against the head 32 of the recorder/player 22 by biasing spring 31, whereby head 32 is cleaned by the rotation of the cleaning element. Also, drive spindle 20 turns hub gear 16 in counter-clockwise direction. Sprocket wheel 27, which meshes with hub gear 16, is driven thereby in the clockwise direction.

After completion of this cleaning operation, the cartridge-shaped cleaner is removed, turned upside down, reinserted, and the recorder/player reactivated. The pinch roller 36 then contacts cleaning element 40 in recess 34, which wipes the pinch roller 36 and capstan 37 as they turn.

The cleaning process can be enhanced by soaking both the cleaning elements 30, 40 with cleaning solvent to chemically loosen the accumulated dirt on the head, pinch roller and capstan.

FIG. 4 shows a compartment 12 which is preferably built into the cassette housing 10 to hold replacement cleaning elements. This compartment 12 is divided into two sections 13, 15, one for the replacement head cleaning elements 30 and the other for the elements 40 used to clean the tape drive assembly 40.

While the present invention has been particularly shown and described with reference to a preferred embodiment, it will be readily appreciated by those of ordinary skill in the art that various changes and modifications may be made without departing from the spirit and scope of the invention. For example, the head cleaning assembly 28 may be mounted in a standard 8-track-type housing for use in 8-track recorder/player units.

In this specification and the accompanying drawings, preferred embodiments of the invention have been shown and described and various alternatives and modifications thereto have been suggested, but it is to be understood that these are not intended to be exhaustive and that many changes and modifications can be made within the scope of the invention. These suggestions herein are selected and included for purposes of illustration in order that others skilled in the art will more fully understand the invention and principles thereof and will thus be enabled to modify it and embody it in a variety of forms, each as may be best suited to the conditions of a particular use.

What is claimed is:

1. A cartridge-shaped cleaning device adapted to clean a head and tape drive assembly of a cassette player and/or recorder unit of the type having a head provided with a face having a portion that lies in a plane, a recess capable of receiving a tape cassette, and tape transport means including a pair of spaced spindles to drive the tape of said cassette, and a pinch roller and capstan, said device comprising a cassette housing configured to fit within the recess; a drive system having first and second hub gears rotatably mounted in said housing and adapted to engage respective spindles of the player/recorder unit when the device is within said recess; transmission means operatively engaging said first and second hub gears for transferring a driving force from one hub gear to the other; a head cleaning assembly mounted in said housing having a cleaning element positionable against the head of the player/recorder unit the device is within said recess; and rotary drive means driven by said pinch roller and capstan and coupled to the head cleaning assembly and adapted to rotate the cleaning element about an axis substantially perpendicular to the plane of the face of the head of the player/recorder unit such that said cleaning element remains in contact with the face of the head substantially throughout the rotational cleaning motion of said cleaning element, said rotary drive means comprising an endless belt for coupling the rotation of the pinch roller and capstan to the element assembly, an idler puller having an axis of rotation substantially parallel to the axis of rotation of said capstan and a driven pulley having an axis of rotation substantially perpendicular to the axis of rotation of said capstan, said driven pulley being mounted to said cleaning assembly for rotation therewith, said endless belt being routed between said capstan and said pinch roller and around both said idler pulley and said driven pulley so that rotation of said capstan and pinch roller causes a corresponding movement of said endless belt which belt, in turn, causes a corresponding rotation of said driven pulley.

2. The cleaning device as recited in claim 1, wherein said transmission means comprises at least one sprocket wheel rotatably mounted in said housing and engaging at least one of said first and second hub gears.

3. The cleaning device as recited in claim 1, wherein said rotary drive means comprises a rod rotatable about the longitudinal axis thereof; means for coupling said rod to said cleaning element; and means for rotatably driving said rod.

4. The cleaning device as recited in claim 3, wherein said means for coupling said rod to said cleaning element comprises a U-shaped holder having arms for slidably holding said cleaning element.

5. The cleaning device as recited in claim 3, wherein the cleaning element comprises a cup, a pad held within said cup, and a cup holder in which said cup is slidable.

6. The cleaning device as recited in claim 1, wherein said cassette housing includes a compartment adapted to hold replacement cleaning elements.

7. A cartridge-shaped cleaning device for cleaning a magnetic head, pinch roller and capstan of a cassette player and/or recorder unit of the type having a recess capable of receiving a tape cassette and a pair of spaced spindles to rotate tape spools normally housed within a cassette positioned in the recess, said cleaning device comprising a cassette housing configured to fit within the recess; a cleaning assembly rotatably mounted in said housing and including a rotatable cleaning element operably positioned against the magnetic head of said unit when said housing is loaded thereinto; drive means mounted in said housing for transferring rotational motion of said pinch roller and capstan to said cleaning assembly to rotate said cleaning assembly when the housing is loaded into the unit, said drive means comprising an endless belt for coupling the rotation of the pinch roller and capstan to the cleaning assembly, an idler puller having an axis of rotation substantially parallel to the axis of rotation of said capstan and a driven pulley having an axis of rotation substantially perpendicular to the axis of rotation of said capstan, said driven pulley being mounted to said cleaning assembly for rotation therewith, said endless belt being routed between said capstan and said pinch roller and around both said idler pulley and said driven pulley so that rotation of said capstan and pinch roller causes a corresponding movement of said endless belt which belt, in turn, causes a corresponding rotation of said driven pulley.

8. The cleaning device as recited in claim 7, further including a tape drive cleaning assembly fixed in said housing to contact the pinch roller and capstan when the cleaner is loaded with the first side upside down into the recess and the recorder/player is activated.

9. The cleaning device as recited in claim 7, wherein said tape drive cleaning assembly comprises a replaceable cleaning element held in the cassette housing by a cleaning element holder.

10. The cleaning device as recited in claim 7, wherein the cleaning assembly comprises a cup and a cup holder, the cup being slidable in the cup holder, a spring to bias the cup outwardly from the cup holder, and a replaceable cleaning element retained by the cup and urged by said spring toward said magnetic head when said housing is loaded into said unit.

11. A cartridge-shaped cleaning device for cleaning the head of a tape player and/or recorder unit of the type having a recess capable of receiving a tape cassette and tape transport means including at least one spindle and a capstan to drive the tape within said cassette when said cassette is operably positioned in the recess of said unit, said cleaning device comprising a housing, a cleaning assembly rotatably mounted in said housing and including a cleaning element positioned for contacting the head of said unit, and drive means mounted in said housing for coupling the driving force of the pinch roller and capstan of the unit to the cleaning assembly, said drive means comprising an endless belt for coupling the rotation of the pinch roller and capstan to the cleaning assembly, an idler puller having an axis of rotation substantially parallel to the axis of rotation of said capstan and a driven pulley having an axis of rotation substantially perpendicular to the axis of rotation of said capstan, said driven pulley being mounted to said cleaning assembly for rotation therewith, said endless belt being routed between said capstan and said pinch roller and around both said idler pulley and said driven pulley so that rotation of said capstan and pinch roller causes a corresponding movement of said endless belt which belt, in turn, causes a corresponding rotation of said driven pulley such that, when said pinch roller and capstan rotate, the cleaning assembly is rotated about an axis substantially perpendicular to the plane of the face of the head.

* * * * *

UNITED STATES PATENT AND TRADEMARK OFFICE
CERTIFICATE OF CORRECTION

PATENT NO. : 4,825,319

DATED : April 25, 1989

INVENTOR(S) : Sam Andreas

It is certified that error appears in the above-identified patent and that said Letters Patent is hereby corrected as shown below:

Claim 1, column 5, line 39, after "unit" insert --when--.

Signed and Sealed this

Second Day of January, 1990

*Attest:*

JEFFREY M. SAMUELS

*Attesting Officer*     *Acting Commissioner of Patents and Trademarks*